United States Patent [19]

Nachtigahl

[11] 4,194,721
[45] Mar. 25, 1980

[54] PLUMBING TEST FITTING

[75] Inventor: Carsten Nachtigahl, Delta, Canada

[73] Assignee: Nako Enterprises Ltd., Surrey, Canada

[21] Appl. No.: 922,817

[22] Filed: Jul. 10, 1978

[51] Int. Cl.² ............................................. F16K 3/312
[52] U.S. Cl. ................................. 251/148; 251/150; 251/326; 251/151; 138/94.3
[58] Field of Search ............... 251/326, 327, 328, 329, 251/148, 150, 151, 152; 138/94.3, 94.5

[56] References Cited

U.S. PATENT DOCUMENTS

| | | | |
|---|---|---|---|
| 2,860,901 | 11/1958 | Whalen | 138/94.3 X |
| 2,893,684 | 7/1959 | Williams et al. | 251/328 |
| 3,860,038 | 1/1975 | Foani | 138/94.3 |
| 4,112,969 | 9/1978 | Still | 251/328 X |

FOREIGN PATENT DOCUMENTS 969523  6/1975  Canada ............................... 251/152

Primary Examiner—William R. Cline
Attorney, Agent, or Firm—Carver & Company

[57] ABSTRACT

A plumbing test fitting for waste or vent pipes and stacks extending between adjacent floors of a building having a closure plate adapted to be slidably fitted between a pair of spaced adjacent ends of a pair of pipes, the joint being sealed by a detachable sealing clamp which also sealably bears against the periphery of the closure plate. A sliding valve element having an operating stem which extends outwards between the pipes and through the sealing clamp can be operated to open or close a passage in the closure plate so as to enable the pipe to be closed for testing and thereafter opened to permit testing fluid to escape down the pipes.

5 Claims, 5 Drawing Figures

U.S. Patent  Mar. 25, 1980  Sheet 1 of 2  4,194,721
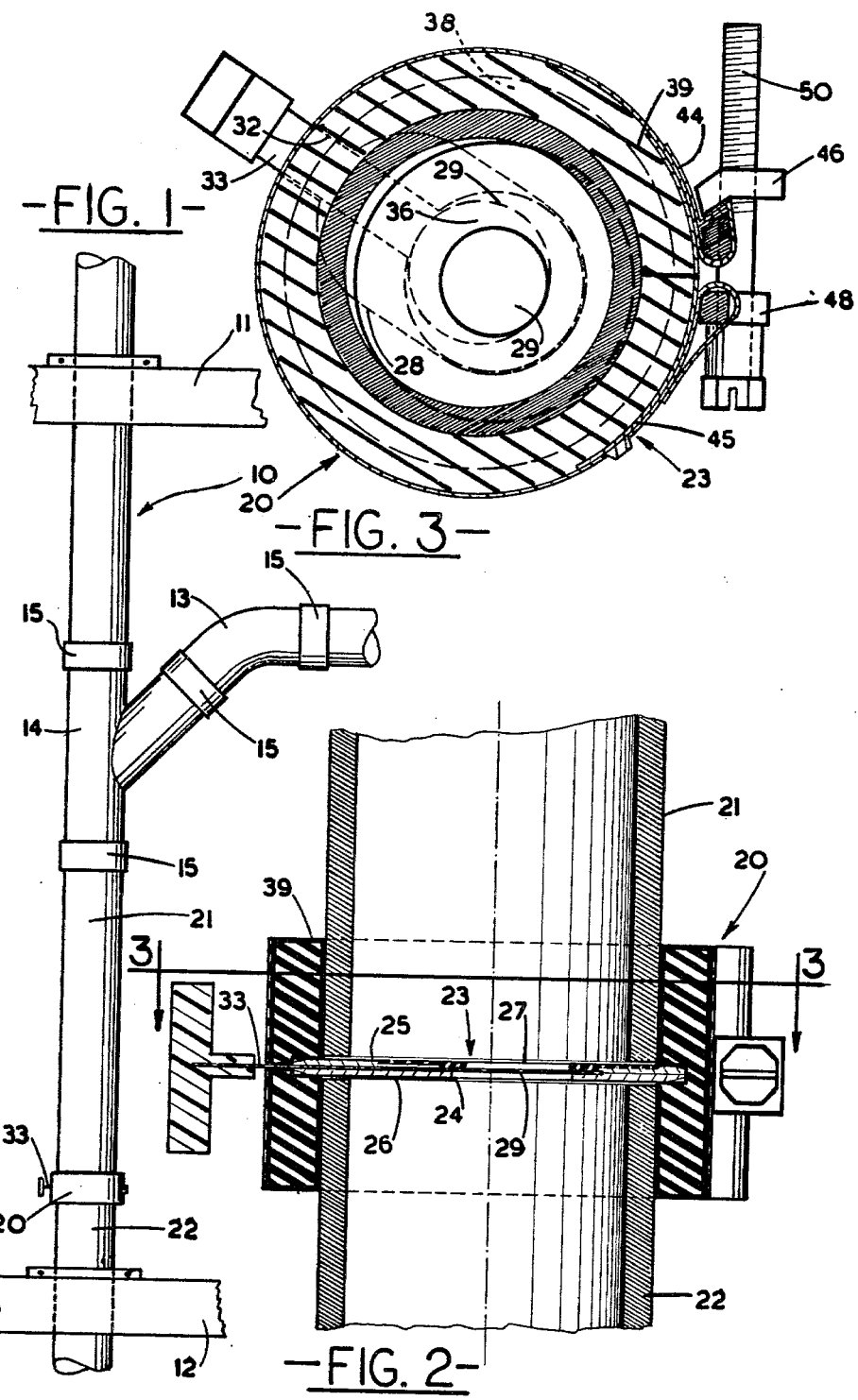

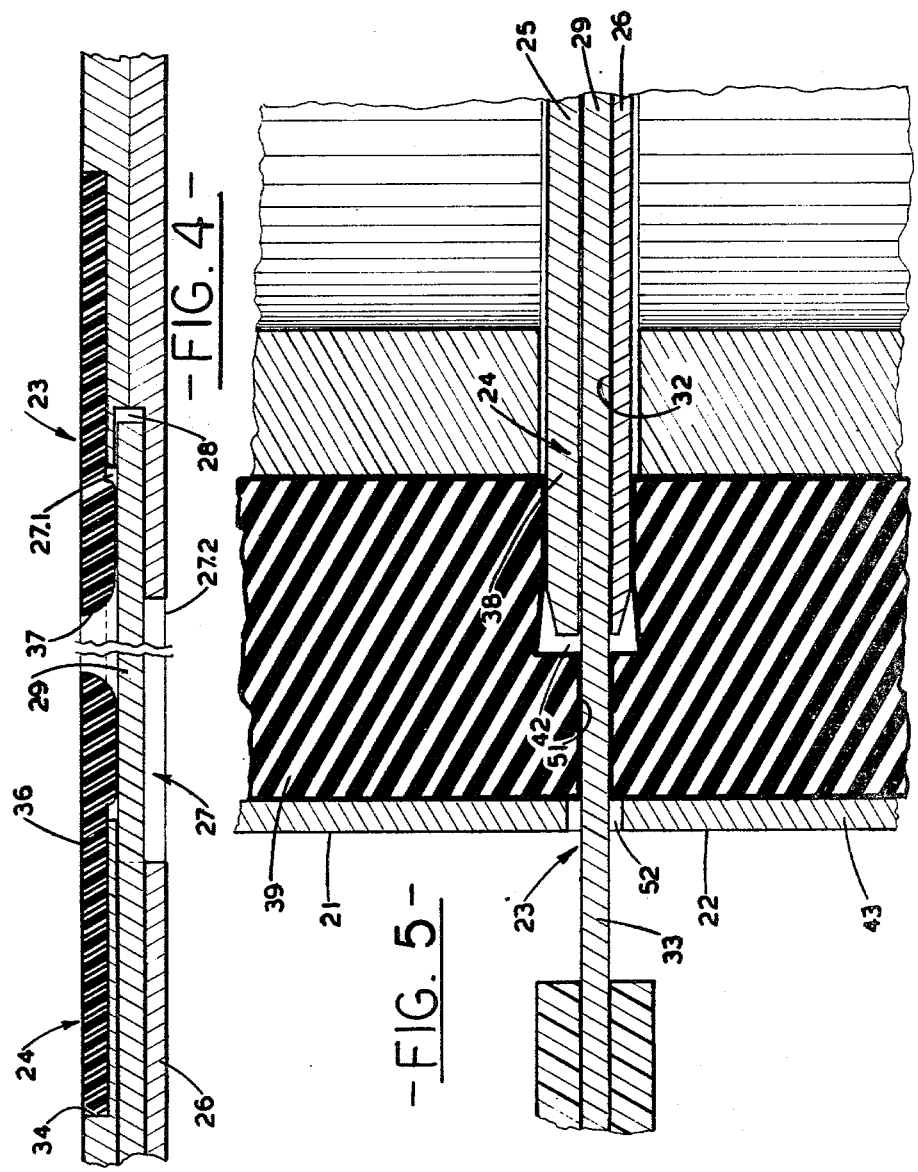

PLUMBING TEST FITTING

BACKGROUND OF THE INVENTION

1. Field of the Invention

This invention relates to test fittings for pressure testing on waste or vent pipes and stacks.

2. Prior Art

In the installation of plumbing systems, particularly waste or vent pipes in buildings, it is necessary to pressure test the pipes for leaks. Prior art testing procedures have usually involved the incorporation of a short test section in the stack which is closed to the passage of fluid therethrough and which, after testing, must be removed and replaced with a comparable length of pipe.

One of the major problems of the prior art testing methods, particularly in multi-story buildings, resides in the disposal of the testing fluid above the test section and its replacement with a permanent stack section. It has usually been the practice to use an open fitting below the test section, into which the testing fluid from the stack above the test section can be discharged. However, in many instances, such fittings are not always easily available and disposal facilities, due to one cause or another, have sometimes failed, leading to excessive water damage.

In recent years a new method of pipe installation has been developed utilizing a type of coupling for adjoining cast iron pipe and pipe fittings which employs a compressible sealing gasket which can be wrapped about a pipe joint and compressed into fluid-tight sealing engagement with the pipe sections by a removable clamp. In this type of connection, the adjoining ends of the pipe sections to be coupled are spaced slightly apart to accept an annular sealing ridge on an inner face of the sealing gasket. It is with this type of cast iron pipe construction that the test fitting of the present invention is adapted to be used.

SUMMARY OF THE INVENTION

The present invention provides a test fitting which can be applied to a joint in a pair of adjoining pipe sections to temporarily replace a removable coupling and which, therefore, does not require the insertion of a new pipe section in its place.

The test fitting of the present invention which, in its normal position, closes communication between joining pipe sections can, prior to its removal, be operated to an open position to enable a testing fluid to be discharged directly from the upper pipe section into the lower pipe section without the use of extraneous tubing, etc., and therefore substantially reduces, if not eliminates, danger of flooding.

The test fitting of the present invention has a closure plate adapted to be slidably fitted between spaced ends of a pair of adjoining pipe sections having a fluid passage which is normally closed by a movable valve element mounted thereon, a compressible sealing gasket adapted to be wrapped circumferentially around the adjoining end portions of the two pipe sections, a flexible clamp adapted to be positioned over the gasket for compressing the gasket into fluid-tight sealing engagement with the stack sections and the closure plate, the gasket and the clamp having aligned openings, and an operating handle connected to the valve element and slidably extending through the openings of the gasket and clamp for operating the valve element from its closed to its open position.

A detailed description following, related to the drawings, gives exemplification of apparatus according to the invention which, however, is capable of expression in means other than those particularly described and illustrated.

DESCRIPTION OF THE DRAWINGS

FIG. 1—is an elevation of a portion of a waste stack showing the test fitting of the invention installed thereon, FIG. 2—is a vertical sectional view, much enlarged, of the test fitting applied to the stack, FIG. 3—is a view taken on Line 3—3 of FIG. 2, FIG. 4—is a much enlarged sectional view of a central portion of the test fitting showing relationship of a valve element relative to a passage in the closure plate, FIG. 5—is a sectional view, much enlarged, showing an edge portion of the test fitting.

DETAILED DISCLOSURE

Referring to the drawings, FIG. 1 shows a portion of a waste pipe 10 extending between a pair of floors 11 and 12, the stack having a branch 13 which is joined to the stack 10 by a "T" section 14 by couplings, severally 15, and having a test fitting 20 in accordance with the invention installed between a pair of pipe sections 21 and 22 below the branch 13 and the "T" section 14.

The test fitting 20, as hereinafter described, is replaceable after testing procedures are completed, by a known type of coupling (not shown) which can be extended around the joint between the pipe sections 21 and 22 to effect a fluid seal. This type of coupling requires that the pipe sections 21 and 22, as particularly shown in FIGS. 2 and 5, be spaced slightly apart.

Referring particularly to FIGS. 2, 3, 4 and 5, the test fitting 20 has a closure plate assembly 23 which has a thin disc-like closure plate 24 which is of composite construction, being formed of an upper plate 25 and a lower plate 26 which are suitably welded together to form a substantially unitary plate. The closure plate 24 has a common fluid passage 27 formed by openings 27.1 and 27.2 in the plates 25 or 26 (see particularly FIG. 4) and adjoining faces of upper and lower plates 25 and 26 are machined or molded to provide an internal valve chamber 28 (shown in FIG. 3 in broken outline) in which a gate valve element 29 is slidably mounted for movement between a closed position over the passage 27 and an open position clear of said passage. A way 32 also extends from the valve chamber and opens out of the edge of the plate to accommodate an operating handle 33 secured to the gate valve element by means of which the gate valve element can be operated between closed and open positions.

The upper plate 25 is also machined to provide a central socket 34 (see FIG. 4) within which an annular sealing element 36 is secured by suitably adhesive and which has an inner thickened lip portion 37 which makes sliding sealable contact with the valve element when the latter is in its closed position. Thickness of the closure plate assembly is such that the entire assembly can be slidably fitted between the stack sections 21 and 22 and its diameter is a little greater than the outside diameter of the pipe sections so as to provide a peripheral extending marginal portion 38 when the assembly is centrally positioned between the pipe sections.

The test fitting also includes a compressible gasket 39 which, preferably, is formed of a single strip of resilient sealing material such as rubber, the length of which is substantially equal to the circumference of the pipe sections 21 and 22 so as to permit the gasket to be wrapped completely about the joint between the sections. The gasket also has a central groove 42 (see FIG. 5) for accepting the extending peripheral portion of the closure plate.

The gasket is compressed into sealing engagement with the pipe sections 21 and 22 and the closure plate by means of a detachable separable clamp 43 which is formed of a flexible metallic ribbon, ends 44 and 45 (see FIG. 3) of which over-lap each other, one of the ends 44 being reversely looped to accept a nut 46. The other end 45 is also looped to accept an annular ear 48 through which a screw 50 is extended to threadedly engage the nut. Both the gasket and the steel ribbon are provided with openings 51 and 52, respectively, through which the operating handle of the gate valve element slidably extends.

In the installation of a waste stack 10, the various pipe sections are interconnected by removable couplings as hereinbefore described. In conducting a pressure test, one of the lower most of the couplings is removed and the test fitting inserted in its place. In order to install the test fitting, the screw and nut are disconnected and the gate valve element is moved to a closed position over the passage in the closure plate. The plate is then fitted between the pipe sections 21 and 22 and the gasket and clamp wrapped there-around and the screw fitted to the nut and the clamp then tightened against the gasket. Ends of the gasket are drawn into sealing engagement with each other and the gasket is also compressed into a fluid-tight sealing engagement with the extending marginal edge portion of the plate and the outside walls of the pipe sections. The gasket is also compressed into fluid-tight sealing engagement with the operating handle of the gate valve element. The stack and its branches above the installed test fitting are filled with water, all openings are sealed and the sealed stack is then pressurized to a pressure normally required under municipal codes to ensure the pipe and the couplings above the test fitting are secure. When testing has been completed, the pressure is relieved and the gate valve element moved to its open position by simply pulling the handle radially outward to allow the water above the test fitting to pass downwards into the pipe section 22. The test fitting can then be removed and a conventional coupling installed in its place.

I claim:

1. A test fitting for installation between a pair of spaced apart aligned pipe sections of a sectionalized waste-pipe comprising:
    (a) a disc-like closure plate having a diameter at least as great as the outside diameter of the waste-pipe sections adapted to be slidably inserted and removed from between said sections, the plate having a passage for providing communication between the pipe sections,
    (b) a valve element mounted on the closure plate operable for closing or opening the passage to passage of fluid between the pipe sections,
    (c) a radially extending operating handle connected to the valve element and extending beyond the periphery of the plate for enabling manual operation of the valve element between open and closed positions,
    (d) a split compressable sealing gasket adapted to be wrapped circumferencially around the periphery of the plate and having a width sufficient so as to overlap the adjacent end portions of the waste-pipe sections, the gasket having an opening for enabling the passage of the operating handle there through,
    (e) a split separable clamp adapted to be extended circumferencially around the gasket and having an opening aligned with the opening of the gasket for enabling the passage of the operating handle there through for compressing the sealing gasket into fluid tight engagement with the periphery of the closure plate, the lapped adjacent end portions of the waste-pipe sections and the operating handle for preventing the escape of water from between the pipe sections and for enabling manual operation of the operating handle to move the valve element from its closed to its open position when the test fitting is applied to the pipe sections.

2. A test fitting as claimed in claim 1 in which the valve element is a sliding gate and the closure plate has a radially elongated guide chamber opening at one end into the passage of the closure plate and at the opposite end out of the periphery of the closure plate for seating and guiding the valve element when the latter is operated between its open and closed positions.

3. A test fitting as claimed in claims 1 or 2 in which the diameter of the closure plate is greater than the outside diameter of the pipe sections so as to have a marginal edge portion extending radially outwards of the pipe sections and the gasket has a central groove for receiving said extending marginal edge portion of the closure plate.

4. A test fitting as claimed in claim 1 in which the clamp is an elongated flexible metallic strip adapted to be wrapped about the gasket and means at opposite ends of the strip for tightening the latter into compressive engagement with the gasket.

5. A test fitting as claimed in claim 2 including an annular sealing element secured to the closure plate at the passage, the sealing element having an annular depending lip extending into the passage for making slidable sealable contact with the valve element.

* * * * *